US006331357B1

(12) United States Patent
Hasegawa et al.

(10) Patent No.: US 6,331,357 B1
(45) Date of Patent: Dec. 18, 2001

(54) ARTICLES WITH STABLE COATINGS HAVING TAILORABLE OPTICAL PROPERTIES

(75) Inventors: Mark M. Hasegawa, Somerville, MA (US); Steven A. Daneman, Westminster, CA (US); Ronaldo R. DeJesus, Los Angeles, CA (US); Henry W. Babel, Huntington Beach, CA (US)

(73) Assignee: McDonnell Douglas Corporation, Huntington Beach, CA (US)

( * ) Notice: Subject to any disclaimer, the term of this patent is extended or adjusted under 35 U.S.C. 154(b) by 0 days.

(21) Appl. No.: 08/232,627

(22) Filed: Apr. 25, 1994

(51) Int. Cl.$^7$ ..................................................... B32B 27/06
(52) U.S. Cl. ............................................ 428/446; 427/162
(58) Field of Search ................................... 428/446, 450, 428/451, 457; 427/387, 162

(56) References Cited

U.S. PATENT DOCUMENTS

| 3,454,410 | 7/1969 | Schutt et al. | 106/374 |
| 3,576,656 | 4/1971 | Webb et al. | 106/296 |
| 3,620,791 | 11/1971 | Krupnick | 106/286.2 |
| 4,008,348 | 2/1977 | Slemp | 428/35 |
| 4,111,851 | 9/1978 | Shai | 252/518 |
| 4,397,716 | 8/1983 | Gilliland et al. | 204/33 |
| 4,741,778 | 5/1988 | Horie et al. | 106/287.16 |
| 4,980,206 | 12/1990 | Torre et al. | 427/385.5 |

OTHER PUBLICATIONS

N. John Stevens, "Application of SERT II Thermal Control Coatings," NASA–Langley publication E5859, pp. 1–33 (1971) no month given.

J. Cordaro et al., "Molecular Enginnering of Pigments for Degradation–Resistant Thermal Control Coatings," AIAA Pub. AIAA–92–2167 (Apr. 1992).

Cheng Hsieh et al., "Conductive White Thermal Control Paint for Spacecraft," 38th International SAMPE Symposium, pp. 609–622 (May 1993).

*Primary Examiner*—Robert Dawson
(74) *Attorney, Agent, or Firm*—Alston & Bird LLP

(57) ABSTRACT

An article is coated with a mixture of a high absorptance pigment, a low absorptance pigment, a low emittance material, and a high emittance binder. Each of the components of the coating are stable when exposed to a space environment. The amounts of the high absorptance pigment and the low absorptance pigment are selected to produce an absorptance of the coating of from about 0.20 to about 0.90, and the amount of the low emittance material is selected to produce an emittance of the coating of from about 0.25 to about 0.90. The low absorptance pigment is preferably a white pigment such as zinc oxide. The high absorptance pigment is preferably a black pigment such as cupric oxide, cobalt oxide, or manganese dioxide. The low emittance material is preferably a metal such as aluminum. The binder is preferably a ceramic such as potassium silicate.

18 Claims, 2 Drawing Sheets

ARTICLES WITH STABLE COATINGS HAVING TAILORABLE OPTICAL PROPERTIES

BACKGROUND OF THE INVENTION

This invention relates to articles having surface coatings with selectively controllable absorptance and emittance, and particularly such articles suitable for use in a space environment.

Spacecraft are exposed to a wide range of external thermal conditions, while functioning in various ways. Care must be taken to maintain the interior of the spacecraft within acceptable limits for the passengers and apparatus occupying the spacecraft. For example, one side of a satellite in earth orbit receives the direct, unfiltered rays of the sun during a portion of the orbital path, and the other side faces a range of conditions that can include the void of space. In another portion of the orbit when in the shadow of the earth, both sides may be exposed to cold conditions. Some parts of the interior of the spacecraft may be occupied by human beings, while other parts may be occupied by electrical apparatus producing large amounts of heat energy that requires a substantial amount of heat dissipation.

A number of active and passive techniques are used to moderate the effects of the radiation and temperature extremes on the interior of the spacecraft. There are active heating and cooling systems, but these can be heavy, bulky, and use a large amount of power. The walls are provided with passive insulation, but desirably the amount of insulation is relatively low because of its weight and bulk. Some spacecraft may be rotated to prevent excessive heat buildup, but in many other cases the spacecraft must maintain a specific orientation in order to perform its mission.

The heat energy reaching and leaving the spacecraft is transferred almost exclusively by radiation, inasmuch as there is no medium for heat transfer by conduction or convection. Therefore, in yet another passive thermal control approach, the exterior surfaces of the spacecraft may be provided with a coating, somewhat similar in character to a specialized paint, that alters the radiative transfer of heat to and from the exterior surfaces. Any coating applied to the exterior surfaces of the spacecraft must adhere well to the surfaces. It must also be stable in the space environment. That is, the components of the coating cannot change their essential character or be lost to the space environment during exposure to the temperature extremes and radiation of space. The coating must not rapidly deteriorate when exposed to the space environment, including UV (ultraviolet) radiation, particle radiation, atomic oxygen, micrometeorites, and orbital debris.

One prior thermal control coating provides a degree of variability in the absorptance thermal control property by including varying amounts of white and black pigments in a ceramic binder. Different compositions of the coating can be used on different spacecraft, and even on different regions of a single spacecraft, to achieve a degree of control over the radiative transfer to and from the surface of the spacecraft. While operable, such a coating falls short of providing the desired broad range of radiative properties required for some applications.

There is a need for an improved approach for passive thermal control of spacecraft. Such an approach should be capable of providing a wide range of thermal control properties and also satisfy the other requirements for use in a space environment.

SUMMARY OF THE INVENTION

The present invention provides a coating, an article using the coating, and a method of preparing such an article. The coating has a controllable range of optical properties, including a controllably wide range of variation of both solar absorptance and infrared emittance. The spacecraft designer therefore has available a wide range of variation in thermal properties of the coating, from which particular formulations can be selected for specific applications. The coating is stable when exposed to the space environment.

In accordance with the invention, a coated article comprises an article having a surface, and a multicomponent coating on at least a portion of the surface of the article. The coating comprising a mixture of a high absorptance pigment, a low absorptance pigment, a low emittance material, and a binder. Preferably, the high absorptance pigment is a finely divided black powder, the low absorptance pigment is a finely divided white powder, the low emittance material is a finely divided metallic powder, and the binder is an inorganic or ceramic material having a high emittance and a low absorptance. Each of the components of the coating is stable when exposed to a space environment.

In one form, the coating comprises a mixture of from about 0 to about 99 parts by weight of a high absorptance pigment, rom about 1 to about 99 parts by weight of a low absorptance pigment, from about 1 to about 99 parts by weight of a low emittance material, balance binder and incidental impurities. The low absorptance pigment is preferably a white pigment such as zinc oxide. The high absorptance pigment is preferably a black pigment such as cupric oxide, cobalt oxide, or manganese dioxide. The low emittance material is preferably a metal such as aluminum. The binder is preferably an inorganic material or a ceramic such as potassium silicate, having a high emittance.

With these variations of high absorptance pigment, low absorptance pigment, and low emittance material, a wide range of physical thermal control properties can be achieved. The absorptance of the coating can be selectively varied from about 0.20 to about 0.90. The emittance of the coating can be selectively and independently varied from about 0.25 to about 0.90.

The ability to tailor the coating properties to control both absorptance and emittance, largely independently of each other, is an important advantage over prior coatings suitable for use in a space environment. In some applications, such as thermal radiators, it is desirable to have a low absorptance and a high emittance, so that the radiator can dissipate interior heat while absorbing little heat from the sun. On the other hand, in some other applications, such as a coating for a propulsion system, it is preferred to have both a high absorptance and a high emittance. The present approach permits the spacecraft designer to utilize a single coating system but to vary the proportions of the components of the coating system to realize the differing thermal properties required for different regions of the spacecraft.

The coating of the invention is readily prepared and applied. The components are mixed together in an aqueous slurry and applied to the surface of the article, preferably by spraying. The coating is dried, either by ambient temperature drying or at slightly elevated temperature. This permits the coating to be used with a wide range of article substrates, such as metals, ceramics, polymers, and composite materials.

DETAILED DESCRIPTION OF THE INVENTION

Figure 1:
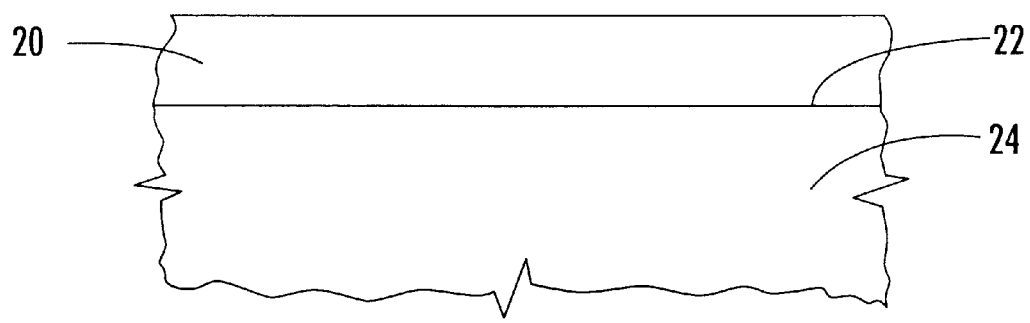
FIG. 1 is a side sectional view of an article having a coating applied to its surface.

FIG. 1 depicts a coating 20 residing on an externally facing surface 22 of an article 24. The coating 20 is prepared and applied according to the approach described subsequently. The article 24 may be made of any solid material, including, for example, a metal, a ceramic, a polymer, or a composite material. No limitation on the type of material of construction of the article 24 is known. No limitation on the use of the article 24 is known, but typically the article 24 is an externally facing wall of a spacecraft or a component attached to a spacecraft.

Figure 2:
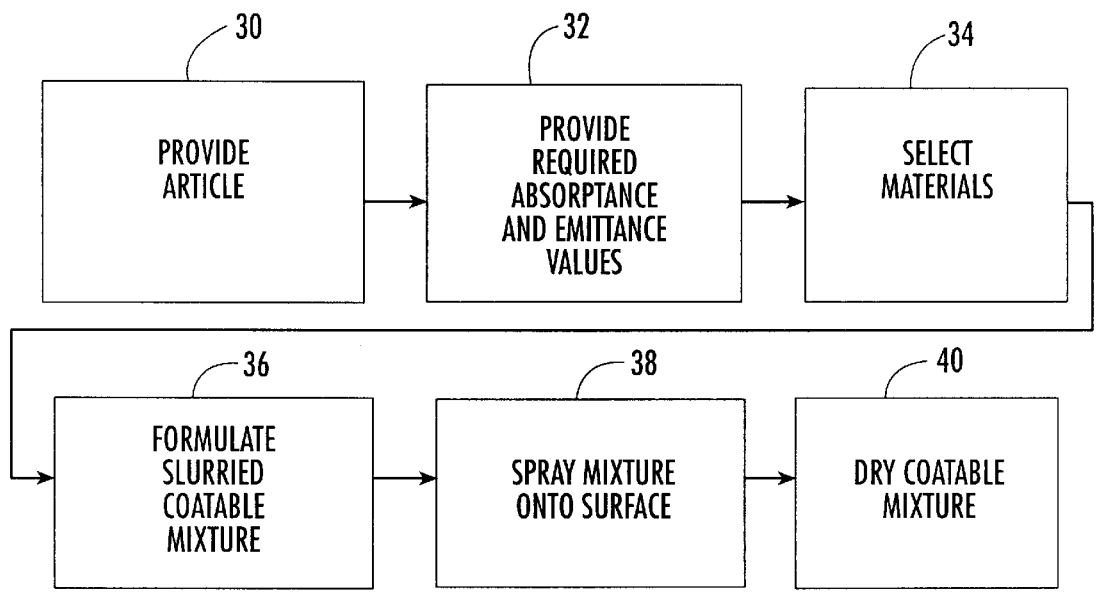
FIG. 2 is a block flow diagram for one approach to utilizing the invention.

In practicing a preferred embodiment of the invention, as depicted in the process of FIG. 2, the article 24 is provided, numeral 30. The required absorptance and emittance of the article are provided, numeral 32. Absorptance is a measure of the incident radiation absorbed by a surface. More specifically, absorptance (also sometimes termed "solar absorptance") is usually measured for radiation in the wavelength range of about 200–2500 nanometers, which encompasses the ultraviolet, visible, and near infrared radiation produced by the sun. Emittance, on the other hand, is a measure of the ability of a body to radiate heat away. Emittance (also sometimes termed "infrared emittance") is usually measured for radiation in the infrared range of about 2500–24000 nanometers that is associated with heat energy.

The absorptance of the surface of an article in space is of particular concern when that surface faces a hot body such as the sun or even the reflected energy of the sun from the earth. The emittance of the surface of the article is of concern at all times, because it determines the ability of the body to re-radiate heat energy that has been absorbed, and also the ability of the body to radiate heat energy that has been conducted to the surface from the interior of the body. Generally, emittance of the surface is a more important factor than absorptance in determining heat flows into and out of the surface, and thence the thermal balance at the surface. It is therefore highly significant to have the ability to provide a coating with both a selectively controllable emittance and selectively controllable absorptance.

The determination and calculation of the actual values of absorptance and emittance required in a particular situation are not a part of the present invention. These values are provided by spacecraft designers who utilize information about the mission of the spacecraft article, its orbit if any, the nature of the article to be coated, the thermal characteristics of space, the sun, and the earth, and other factors to calculate the desired absorptance and emittance. It is pertinent here that different spacecraft and portions of spacecraft have varying requirements for a coating, which include ranges of absorptance from low values to high values, and ranges of emittance from low values to high values. The coating of the invention can be formulated to have absorptance and emittance values covering such a wide range.

The materials for the coating are selected, numeral 34. The final coating preferably comprises four components: a high absorptance material, a low absorptance material, a low emittance material, and a binder which is typically of high emittance. Other components can be added as well, as long as they do not interfere with the optical properties of the coating. For example, particles that absorb electromagnetic energy, ingredients that improve adhesion of the coating to particular articles, coating hardeners, or ingredients that perform other functions can be added to the coating, to the extent that they do not impair or prevent the coating from having the desired absorptance and emittance.

The nature of, and relative amounts of, the high absorptance material and the low absorptance material determine the absorptance of the coating. The low absorptance material is preferably a white pigment such as zinc oxide, but can also be a white pigment such as zinc orthotitanate, titanium dioxide, or zirconium oxide. The high absorptance material is preferably a black pigment such as cupric oxide, cobalt oxide, or manganese dioxide, but can also be a black pigment such as carbon-doped silica or other metal oxide.

The pigments of both types are provided in a finely divided form. In a most preferred embodiment, calcined zinc oxide having a particle size of about 3–7 micrometers is available commercially from Zinc Corporation of America. If the zinc oxide is obtained in an uncalcined form, it is preferably baked for 16 hours at about 625° C. in a clean furnace to obtain a calcined zinc oxide. The calcined zinc oxide results in the best combination of coating adhesion and optical properties.

The most preferred high absorptance material, cupric oxide, having a particle size of about 1–5 micrometers, is available commercially from Aldrich Chemical Co.

The low emittance material is preferably a metal, and most preferably particles of aluminum (which includes aluminum alloys, as the term is used herein). Other metals such as gold, silver, and nickel (and their alloys) can also be used. Increasing amounts of the low emittance material increasingly lower the emittance of the final coating. In a most preferred embodiment, aluminum powder having a particle size of about 20–30 micrometers is available commercially from Alcan-Toyo America.

A binder is used to bind together the particles of the high absorptance material, the low absorptance material, and the low emittance material, and to cause the mixture of these particles to adhere well to the surface of the article 24. The preferred binder is a ceramic material that itself has a low absorptance and a high emittance, and most preferably is potassium silicate ($K_2SiO_3$). Other binders such as sodium silicate and lithium polysilicate can also be used. The potassium silicate binder material is available commercially as a slurry in water from the PQ (Philadelphia Quartz) Corporation. The water acts as a carrier liquid when the mixture of the four components is prepared and applied. If water were not furnished as part of the binder mixture or otherwise, water or some other carrier liquid would normally be added in an amount sufficient to facilitate mixing of the components and subsequent application of the mixture to the surface of the article. The water or other carrier liquid is evaporated when the coating dries.

Each of the selected materials must be stable in a space environment. That is, the materials must comply with the outgassing requirements specified in ASTM E595-84 and be resistant to degradation from particle radiation, UV radiation, atomic oxygen, vacuum and other space constituents. Not all materials that would otherwise provide the required thermal properties meet this requirement. Carbon black, for example, is not preferred as a high absorptance pigment for most applications because it is unstable in the combination of UV radiation, atomic oxygen, and vacuum encountered in low earth orbit.

The selected materials are formulated into a coatable mixture, numeral 36. The amount of each material in the mixture determines its optical properties (in the case of the high absorptance material, the low absorptance material, and the low emittance material) or the mechanical characteristics of the coating and its ability to adhere to the surface of the article. The amounts of the materials include from about 0 to about 99 parts by weight of the high absorptance pigment, from about 1 to about 99 parts by weight of the low absorptance pigment, and from about 1 to about 99 parts by weight of the low emittance material. The amounts of the constituents can be varied over these broad ranges to achieve a broad range in the absorptance and emittance of the final coating. At least about 1 part by weight of the low absorptance material must be present, as the low absorptance material improves the consistency and spreadability of the coating.

At least about 1 part by weight of the low emittance material must be present. Inorganic coatings, such as those described herein, typically have an emittance of 0.90 or slightly greater when no low emittance material such as aluminum is present. Although it is possible to reduce the coating thickness to lower the emittance, it is not practical to do so. It is extremely difficult to obtain a thin, uniform inorganic coating which completely masks the optical properties of the substrate and maintains its physical integrity. The low emittance material is added to reduce the emittance of the coating. The low emittance material must be present in an amount of at least about 1 part by weight to reduce the emittance sufficiently to be significant (see Example 1, presented subsequently.)

The balance of the coating is binder and incidental impurities. It is preferred to maintain the ratio of pigment plus low emittance material to binder at about 0.8–0.9, so that about 40–45 percent of the total of pigment, low emittance material, and binder is pigment and low emittance material. Water or other carrier liquid is present before drying the coating in an amount sufficient to permit working and application, and is removed in drying.

The selected amounts of the selected components are mixed together to form the mixture that is to be applied to the surface of the article. In the preferred embodiment the water in the potassium silicate binder slurry acts as a carrier liquid. Additional water can be added to thin the mixture to an acceptable consistency for the application process that is to be used, or water could be removed by evaporation if necessary. The components are placed into a ball mill and mixed for about ½ hour to produce a uniform, smooth mixture.

The mixture is applied to the surface of the article by any operable technique. The preferred application technique is spraying from a paint sprayer, numeral 38. For this approach to be used, the mixture has the consistency of house paint. Alternatively, other application techniques such as painting, dipping, etc. can be used.

After the mixture is applied to the surface, it is dried, numeral 40, to remove the carrier liquid, in this case water. The drying process can be accelerated by heating the coated article slightly. Drying is preferably accomplished by exposure to air at ambient temperature in a controlled humidity environment for about one week. An advantage of the present coating formulation is that it can be processed at ambient temperature, and no elevated temperature curing or firing is required. The process is therefore suitable for use with articles made of materials that cannot withstand high elevated temperatures, such as polymers or polymer-matrix composites.

After drying, the coated article is ready for use.

Coatings and coated articles have been prepared according to the present invention. The following examples are presented to illustrate aspects of the invention, but should not be taken as limiting of the invention in any respect.

In preparing the coatings used in these examples, the amounts of the constituents were weighed on a scale. The specific formulations are presented in the following examples. The constituents were combined and milled in a Burundum-fortified porcelain mixing jar with Burundum grinding media for 30 minutes.

Before coating, aluminum substrates were prepared either by grit blasting or a sulfuric acid anodization as set forth in MIL-A-8625. The substrates were cleaned using a 10 percent Alconox™ water solution and a lint free cloth, rinsed with a technical grade acetone, and inspected for any surface residue. The panels were dried in air. The substrates were "rub primed" with the coating material and allowed to cure for 24 hours.

A standard spray gun and filtered air were used to apply the coating to the primed surfaces. (For applications to larger surfaces, a high volume, low pressure spray gun is preferred.) A low spraying pressure of about 25 pounds per square inch was used to prevent the deposition of too dry a coating. The spray nozzle was held within twelve inches of the substrate during the spray application.

The aluminum panels were mounted horizontally in a ventilation hood for coating application. The first coating pass in a first direction deposited between 0.001 and 0.002 inches of wet coating on the surface. A second coating pass in the opposite direction deposited another 0.001 to 0.002 inches of wet coating on the surface. The panels were cured for a sufficient period of time, typically about 15–30 minutes, to allow the surface finish to change from a specular appearance to a diffuse appearance. After curing, another two coating passes like those described above were made over the same area. The final wet thickness of the thermal control coating, applied in a total of four passes, was about 0.004–0.008 inches.

The coated substrate panels were fully cured for seven days in a room having a temperature of 70–75° F. (ambient temperature) and a relative humidity of 60–70 percent. After curing, the coating thickness was about 0.002–0.004 inches. The absorptance and emittance of the coating were measured after curing was complete.

These examples are presented to illustrate the range of optical properties available with the coating of the invention. In these examples, the numbers in parentheses indicate the percentages of each component of the total of pigment plus low emittance material.

EXAMPLE 1

A coating was formulated using 0.5 grams of aluminum (1 percent), 40 grams of manganese dioxide (98 percent), 0.5 grams of zinc oxide (1 percent), and 30 grams of potassium silicate binder in water. The measured absorptance was 0.80, the measured emittance was 0.81, and the absorptance/emittance ratio was 1.0.

EXAMPLE 2

A coating was formulated using 2.0 grams of aluminum (5 percent), 38 grams of manganese dioxide (94 percent), 0.5 grams of zinc oxide (1 percent), and 25.5 grams of potassium silicate binder in water. The measured absorptance was 0.54, the measured emittance was 0.50, and the absorptance/emittance ratio was 1.1.

EXAMPLE 3

A coating was formulated using 4.0 grams of aluminum (10 percent), 36 grams of manganese dioxide (89 percent), 0.5 grams of zinc oxide (1 percent), and 29 grams of potassium silicate binder in water. The measured absorptance was 0.32, the measured emittance was 0.38, and the absorptance/emittance ratio was 0.84.

EXAMPLE 4

A coating was formulated using 10 grams of aluminum (25 percent), 30 grams of manganese dioxide (74 percent), 0.5 grams of zinc oxide (1 percent), and 27.5 grams of potassium silicate binder in water. The measured absorptance was 0.22, the measured emittance was 0.25, and the absorptance/emittance ratio was 0.88.

EXAMPLE 5

A coating was formulated using 15 grams of aluminum (31 percent), 20 grams of manganese dioxide (68 percent), 0.5 grams of zinc oxide (1 percent), and 40 grams of potassium silicate binder in water. The measured absorptance was 0.21, the measured emittance was 0.25, and the absorptance/emittance ratio was 0.84.

EXAMPLE 6

A coating was formulated using 0.7 grams of aluminum (2 percent), 0.3 grams of manganese dioxide (1 percent), 29 grams of zinc oxide (97 percent), and 40 grams of potassium silicate binder in water. The measured absorptance was 0.34, the measured emittance was 0.38, and the absorptance/emittance ratio was 0.39.

EXAMPLE 7

A coating was formulated using 10.4 grams of aluminum (18 percent), 46.7 grams of zinc oxide (82 percent), and 37.6 grams of potassium silicate binder in water. The measured absorptance was 0.41, the measured emittance was 0.58, and the absorptance/emittance ratio was 0.70.

EXAMPLE 8

A coating was formulated using 29.2 grams of aluminum (50 percent), 29.1 grams of zinc oxide (50 percent), and 55.4 grams of potassium silicate binder in water. The measured absorptance was 0.30, the measured emittance was 0.39, and the absorptance/emittance ratio was 0.75.

EXAMPLE 9

A coating was formulated using 17.9 grams of aluminum (99 percent), 0.2 grams of zinc oxide (1 percent), and 13.1 grams of potassium silicate binder in water. The measured absorptance was 0.23, the measured emittance was 0.26, and the absorptance/emittance ratio was 0.88.

This invention has been described in connection with specific embodiments and examples. However, those skilled in the art will recognize various modifications and variations of which the present invention is capable without departing from its scope as represented by the appended claims.

What is claimed is:

1. A coated article, comprising:
   an article having a surface; and
   a multicomponent coating on at least a portion of the surface of the article, the coating comprising a mixture of a low absorptance pigment, a low emittance material, a binder, and, optionally, a high absorptance pigment, each of the components of the coating being stable when exposed to a space environment.

2. The coated article of claim 1, wherein the article is made of a material selected from the group consisting of a metal, a ceramic, a polymer, and a composite material.

3. The coated article of claim 1, wherein the low absorptance pigment has a white color.

4. The coated article of claim 1, wherein the low absorptance pigment is selected from the group consisting of zinc oxide, zinc orthotitanate, zirconium oxide, and titanium dioxide.

5. The coated article of claim 1, wherein the high absorptance pigment has a black color.

6. The coated article of claim 1, wherein the high absorptance pigment is a pigment selected from the group consisting of cupric oxide, cobalt oxide, manganese dioxide, and carbon-doped silica.

7. The coated article of claim 1, wherein the low emittance material is a metal.

8. The coated article of claim 1, wherein the low emittance material is selected from the group consisting of aluminum, gold, silver, and nickel, and alloys of each of the metals.

9. The coated article of claim 1, wherein the binder is a ceramic material.

10. The coated article of claim 1, wherein the binder is selected from the group consisting of potassium silicate, sodium silicate, and lithium polysilicate.

11. The coated article of claim 1, wherein the amounts of the high absorptance pigment and the low absorptance pigment are selected to produce an absorptance of the coating of from about 0.20 to about 0.90, and the amount of the low emittance material is selected to produce an emittance of the coating of from about 0.25 to about 0.90.

12. A coated article, comprising:
    an article having a surface; and
    a multicomponent coating on at least a portion of the surface of the article, the coating comprising a mixture of from about 0 to about 99 parts by weight of a high absorptance pigment, from about 1 to about 99 parts by weight of a low absorptance pigment, from about 1 to about 99 parts by weight of a low emittance material, balance binder and incidental impurities, each of the components of the coating being stable when exposed to a space environment.

13. The coated article of claim 12, wherein the low absorptance pigment is a pigment having a white color, the high absorptance pigment is a pigment having a black color, and the low emittance material is a metal.

14. The coated article of claim 12, wherein the low absorptance pigment is selected from the group consisting of zinc oxide, zinc orthotitanate, zirconium oxide, and titanium dioxide, the high absorptance pigment is selected from the group consisting of cupric oxide, cobalt oxide, manganese dioxide, and carbon-doped silica, the low emittance material is selected from the group consisting of aluminum, gold, silver, and nickel, and alloys of each of the metals, and the binder is selected from the group consisting of potassium silicate, sodium silicate, and lithium polysilicate.

15. The coated article of claim 14, wherein the amounts of the high absorptance pigment and the low absorptance pigment are selected to produce an absorptance of the coating of from about 0.20 to about 0.90, and the amount of the low emittance material is selected to produce an emittance of the coating of from about 0.25 to about 0.90.

16. The method for preparing a coated article, comprising the steps of:
    providing an article having a surface;
    preparing a selected composition of a multicomponent coating whose absorptance can be selectively varied over a range of from about 0.20 to about 0.90, according to the selected composition of the coating, and whose emittance can be selectively varied over a range of from about 0.25 to about 0.90, according to the composition of the coating, wherein the step of preparing includes the step of forming a coating comprising a mixture of a low absorptance pigment, a low emittance material, a binder, and, optionally, a high absorptance pigment; and applying the selected composition of the multicomponent coating to the surface of the article.

17. The method for preparing a coated article, comprising the steps of:

providing an article having a surface;

preparing a selected composition of a multicomponent coating whose absorptance can be selectively varied over a range of from about 0.20 to about 0.90, according to the selected composition od the coating, and whose emittance can be selectively varied over a range of from about 0.25 to about 0.90, according to the selected composition of the coating, wherein the step of preparing includes the step of providing a mixture comprising:

a low absorptance pigment selected from the group consisting of zinc oxide, zinc orthotitanate, zirconium oxide, and titanium dioxide, a high absorptance pigment selected from the group consisting of cupric oxide, cobalt oxide, manganese dioxide, and carbon-doped silica, a low emittance material selected from the group consisting of aluminum, gold, silver, and nickel, and alloys of each of the metals, and a binder selected from the group consisting of potassium silicate, sodium silicate, and lithium polysilicate; and applying the selected composition of the multicomponent coating to the surface of the article.

18. The method for preparing a coated article, comprising the steps of:

providing an article having a surface;

preparing a selected composition of a multicomponent coating whose absorptance can be selectively varied over a range of from about 0.20 to about 0.90, according to the selected composition of the coating, and whose emittance can be selectively varied over a range of from about 0.25 to about 0.90, according to the selected composition of the coating, wherein the step of preparing includes the steps of providing a required absorptance and emittance of the surface of the article;

selecting a selected combination of high absorptance material, low absorptance material, and low emittance material that, as a coating with a binder, will exhibit the required absorptance and emittance;

formulating the selected combination; and depositing a layer of the selected combination on the surface of the article; and applying the selected composition of the multicomponent coating to the surface of the article.

* * * * *